United States Patent [19]

Drobot

[11] 4,257,807

[45] Mar. 24, 1981

[54] PRECIOUS METALS RECOVERY PROCESS

[75] Inventor: Walter Drobot, Montclair, N.J.

[73] Assignee: Engelhard Minerals & Chemicals Corporation, Iselin, N.J.

[21] Appl. No.: 120,799

[22] Filed: Feb. 12, 1980

[51] Int. Cl.$^3$ .............................................. C22B 11/04
[52] U.S. Cl. .................................. 75/108; 75/101 BE;
   75/118 R; 75/118 P; 75/121; 210/688; 423/22;
   423/24
[58] Field of Search ................... 75/108, 101 BE, 121,
   75/118 R, 118 P; 423/22, 24; 210/38 B

[56] References Cited

U.S. PATENT DOCUMENTS

| 630,951 | 8/1899 | Vanino | 75/108 |
|---|---|---|---|
| 1,472,115 | 10/1923 | Clark | 75/108 X |
| 3,255,172 | 6/1966 | Krajewski et al. | 75/101 BE |
| 3,931,002 | 1/1976 | Ottenheym et al. | 210/38 B X |
| 3,982,932 | 9/1976 | Korosi | 75/118 P |
| 4,013,585 | 3/1977 | Terajima et al. | 210/38 B X |

*Primary Examiner*—G. Ozaki

[57] ABSTRACT

Platinum, palladium, rhodium, ruthenium, iridium and other metals are recovered from aqueous media containing precious metal ions in solution by contacting the metal-containing solution with blood meal to collect the metals in concentrated insoluble form in the blood meal, and recovering the thus collected metals from the resulting metals-loaded blood meal.

10 Claims, 1 Drawing Figure

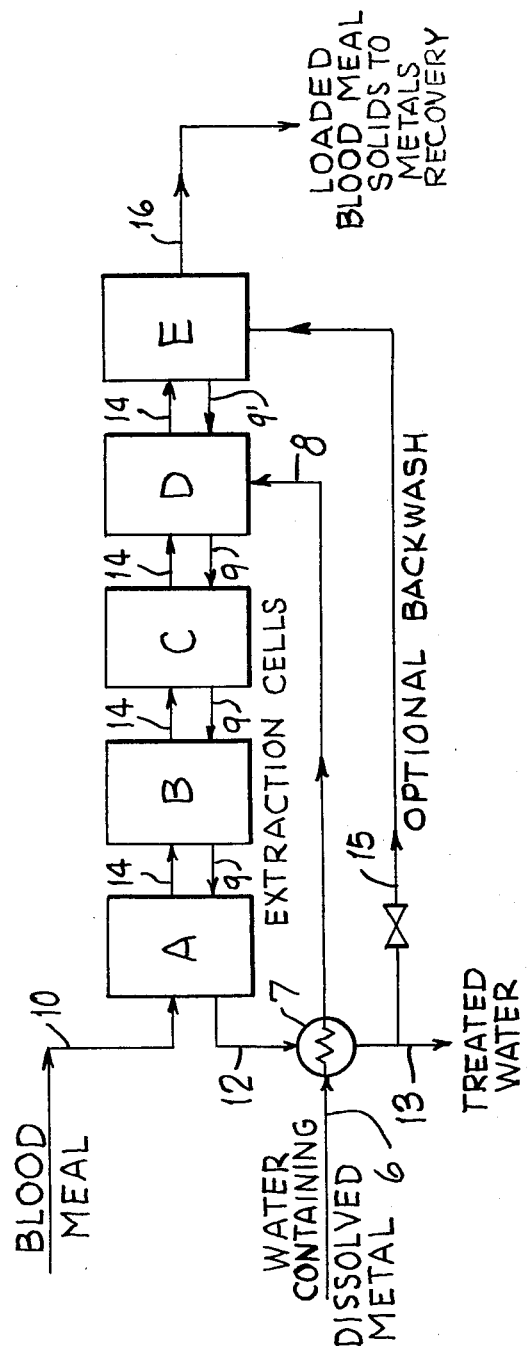

PRECIOUS METALS RECOVERY PROCESS

This invention relates to a process of recovering metals from aqueous solutions of compounds of the metals, including dilute acidic solutions of metal salts, by contacting an aqueous solution containing dissolved metals with blood meal. In one of its more specific aspects, this invention relates to a process for recovering precious metals, in which base metals may also be recovered, from an aqueous liquid containing one or more such metals in solution by contacting said aqueous liquid with blood meal, a commercially available by-product of the meat-packing industry derived by the cooking and drying of collected animal blood to a granular, particulate form.

Industrial waste waters often contain various metals which for ecological or economical reasons it would be desirable to recover or remove from the water. It is known, for example, that large quantities of gold and other valuable metals are contained in sea water, but, up until the present time at least, there has been no economic method for their recovery. Many industrial waste waters, including spent plating liquors and metals refinery waste solutions, contain dissolved salts of such economically important metals as platinum, rhodium, palladium, ruthenium, iridium, gold and silver, as well as base metals, such as zinc, aluminum, iron, copper, tin, and nickel. Such dissolved metals may be present, for example, as cations as well as in the form of anionic complexes and are contained in such described waste waters.

Precipitation by chemical methods and electrodeposition (or electrowinning) have been used for the removal or recovery of metal values from dilute aqueous solutions. Frequently, the concentrations of the metals are so low that the cost of recovering them from solutions by these methods exceeds their value. This invention now provides a process by which it is economically feasible to recover noble metals and other valuable metals from dilute solution, and including acidic solutions.

In my copending patent application, filed concurrently herewith, metals are recovered from dilute aqueous solutions in which such metals are present in dissolved form by contacting the aqueous solution with fibrous proteinaceous materials selected from the group consisting of animal hair, hoof and horn meal, and feathers. It has now been discovered that certain waste or by-product proteins which result from the meat industry, particularly products known in the trade as dried blood meal, flash dried blood meal or ring dried blood meal are effective for the recovery of precious metals from aqueous solutions.

In the process of the present invention an animal protein, specifically, blood meal is utilized for the recovery of precious metals from aqueous solutions. The process is carried out by contacting the aqueous solution with the blood meal for a period of time sufficient to remove the dissolved metals from their solutions. The time of contact between the solution and the blood meal may vary from about 10 minutes to 60 hours, preferably 1 to 12 hours. The optimum contact time required for substantial removal of any given metal from solution will depend to some extent upon the particular batch and source of blood meal and the particular metal and composition of the solution undergoing recovery. Optimum contact times and blood meal addition ratios may be determined readily by trial for any given blood meal and aqueous metal solution. The effectiveness of the blood meal for removal of a metal in accordance with this invention depends to some extent also upon the extent to which the blood meal has been already loaded with recovered metals.

The pH of the solution undergoing treatment preferably is within the range of 1 to 3, preferably, 2 to 3 for recovery of precious metals. While extraction of metals from aqueous solutions occurs over a wide pH range, test results indicate that pH values in the range of 5 to 11 are less favorable than pH values within the range of 1 or less up to 5, while maximum recoveries of precious metals occur within the preferred pH range of 2 to 3.

The extraction of metal values from dilute solutions by the process of this invention is preferably carried out at atmospheric pressures and ambient temperatures above the freezing point of the solution although higher pressures and temperatures may be used. The process may be carried out at higher temperatures. For example, temperatures of greater than 0° C. to 90° C. or higher may be used. At higher temperatures (above 100° C.) a pressurized system may be used to control evaporative losses. Preferably, temperatures within the range of 5° to 50° C. are employed.

Contact between the metal-containing solution and the blood meal may be continuous or batchwise. In a batch type operation, the dosage of blood meal may be within the range of less than 1 to 20 weight percent or greater, based on the weight of the aqueous solution. A preferred method of operation involves continuous countercurrent contact between the aqueous solution and the blood meal. In one preferred embodiment of a continuous countercurrent contacting method of operation, the blood meal is continuously moved through an elongated contacting zone. An aqueous solution containing dissolved metals is passed through the elongated extraction zone in continuous countercurrent contact with the blood meal, contacting first blood meal more nearly saturated with respect to recovered metal values, then blood meal containing a lesser amount of recovered metals, and so on until the last blood meal contacted is essentially barren of recovered metal, or substantially fresh blood meal. The blood meal loaded with metal is removed from the contacting zone and processed for the recovery of metal values therefrom. As blood meal loaded with recovered metals is withdrawn from one end of the extraction zone for the recovery of metals therefrom, fresh make-up blood meal is supplied at the other end of the extraction zone. In a similar manner, aqueous solutions may be successively passed through a series of contacting zones containing blood meal solids which are stirred or agitated or maintained in a fluidized solids bed condition. All of these systems are well known in the arts of solvent extraction, water treatment, and the like.

Alternatively, successive batches of fresh, i.e., untreated, solution may be brought into contact with a batch of solid particulate blood meal, preferably in a contactor containing a stirrer or other appropriate means of agitation, and the batch processing continued until the blood meal becomes loaded with metal. When the effectiveness of the blood meal for metal recovery is substantially diminished due to loading with metal, the metals-loaded blood meal may be removed from the reactor and processed for recovery of metal values. Fresh or regenerated blood meal is charged to the reactor to replace the loaded material removed therefrom.

A series of two or more batch reactors may be employed in countercurrent fashion, in which treated aqueous liquid from one reactor is supplied as the aqueous liquid feed to another reactor. The second or any subsequent reactor may contain the same or a different blood meal from that of the first or precedent reactor, the blood meal in the second reactor having a lesser degree of metals saturation than that in the first reactor, and so on. In a batch type operation, the relative proportions of blood meal to solution may be within the range of 10 to 500 grams per liter of solution, preferably in the range of 50 to 200 grams per liter. The relative proportions of blood meal to aqueous solution generally affects the rate of metals removal and the time required to achieve either substantially complete metals removal or saturation of the blood meal with recovered metals.

In accordance with the present invention, the metal values, i.e., the recovered metals, are removed from the blood meal containing the precious metals extracted from an aqueous solution by physical separation from the treated solution, followed by extraction of the metal values from the blood meal. Extraction of metal values may be accomplished by drying and complete oxidation of the organic matter in the blood meal whereby the precious metal remains in the ash as a solid residue. Metal values may be recovered from either the metal-containing blood meal or its ash by any of various known refining methods. For example, the metal values may be recovered by re-dissolving the metal in a concentrated mineral acid, such as hydrochloric acid or nitric acid, or its mixtures, and the metal values recovered from the concentrated solution in known manner.

The accompanying drawing is a simplified diagrammatic representation of one embodiment of apparatus suitable for use in carrying out the process of this invention.

With reference to the drawing, a continuous multistage contacting process is illustrated utilizing a series of cells or contact zones. It is to be understood that the principles of this invention apply regardless of the number of cells or contact zones, their arrangement or their configuration in the plant design. A plurality of contact cells or zones are illustrated and are designated by the letters A, B, C, D, and E. As illustrated, contactor cells A, B, C, and D are in service removing metal values from aqueous solutions containing dissolved metal salts, for example, waste water from a precious metals refinery. Cell E is in the process of separating aqueous solution from solid protein and discharging the loaded protein solids for further treatment to recover the metals removed by the solids from the aqueous solution undergoing treatment.

A dried blood meal is charged into contactor A through line 10. The contactor cells may be identical in construction and may comprise fixed or fluidized beds of blood meal. In one specific embodiment, the cells may be the cells of a continuous diffuser, e.g., a chain-type or scroll-type continuous diffuser, known in the art. As illustrated the aqueous medium undergoing treatment and the blood meal solids pass countercurrently to one another through the cells of the contactor. Provision may be made for backwashing the solids before they are discharged from the contactor, as described hereinafter.

Aqueous solution containing metals in ionic and/or undissociated molecular form, i.e., metals in solution, enters the system through line 6 where it may be passed through heat exchanger 7 to heat or cool the solution to the desired contacting temperature. The aqueous solution, e.g., refinery waste water, is introduced through line 8 to contactor cell D of the figure where it is intimately contacted with a mass of blood meal. The treated liquid, which may contain some entrained solids, flows from cell D to cell C as indicated diagrammatically by line 9. In cell C, the water containing residual metal values not removed by the blood meal in cell D again contacts a mass of blood meal, effecting further removal of metal values from the aqueous liquid feed stream. The treated liquid from cell C, in turn, flows into cell B and, finally, from cell B to cell A where it contacts fresh blood meal introduced into cell A through line 10. Treated water, depleted in metal ions, is discharged from cell A through line 12 and may be passed through heat exchanger 7 and then through line 13 for disposal or recirculation to the process from which the solution was derived by line 15 as backwash to cell E and line 9'.

The treated water may be filtered or subjected to other conventional treatment before final discharge from the system.

As the blood meal become loaded with metals, the rate at which it is able to remove metals from solution gradually diminishes. The fresh blood meal in cell A is contacted with aqueous solution which has already been subjected to several contacts with partially loaded blood meal in cells B, C, D, and E. The position of the blood meal is sequentially transferred from the position of cell A to the position of cell B, from cell B to cell C, and so on to the position of cell E, as indicated diagrammatically by lines 14. Loaded blood meal, i.e., blood meal containing recovered metals in water-insoluble form, is removed from cell A through line 16 and processed for metals recovery.

The following examples illustrate the comparative effectiveness of dried blood meal for recovery of various metals from solution.

EXAMPLE 1

In a series of tests, three ten-gram samples of flash dried commercial blood meals were placed in each of three two-liter Erlenmeyer flasks with 100 ml samples of a metals refinery process solution containing precious metals and placed on a reciprocal shaking machine at 28° C. for 15 hours. In Runs 1 and 2, the blood meals were derived from hog blood (Smithfield Packing Company, Smithfield, Virginia) sold under trade designations "BLMSR" and "BLMHP", respectively. In Run 3, the blood meal was a flash dried blood meal produced from a mixture of hog blood and beef blood (Wilson & Company, Oklahoma City, Oklahoma). At the end of the test, each of the metals-loaded blood meals was separated from the aqueous solution by vacuum filtration through Whatman No. 4 filter paper and the filtrate analyzed for residual precious metals contant. Test results are summarized in Table I.

TABLE I

| PM | Control Sol'n. mg/l | Run 1 Filtrate Conc. mg/l | Run 2 Filtrate Conc. mg/l | Run 3 Filtrate Conc. mg/l |
|---|---|---|---|---|
| Pt | >>100 | 5.1 | 4.5 | 4.4 |
| Pd | 160 | 1.1 | 0.98 | 0.54 |
| Rh | 49 | 31. | 20.0 | 45. |
| pH | <1 | <1 | <1 | <1 |

EXAMPLE 2

Further tests were carried out with a commercial rotary dried blood meal (Swift & Company, Rochelle, Illinois), a mixture of beef and hog bloods, with a sample of another metal refinery process solution to determine the percentage of various precious metals which could be recovered in a single extraction step. Tests were carried out under the conditions of Example 1. In Run 4, the aqueous solution was treated with an equivalent concentration of 50 grams of blood meal per liter of solution; in Run 5, the dosage was 75 grams per liter. The results are shown in Table II.

TABLE II

| PM | Control Sol'n. mg/l | Run 4 Filtrate Conc. mg/l | Run 4 Percent Recovery % | Run 5 Filtrate Conc. mg/l | Run 5 Percent Recovery % |
| --- | --- | --- | --- | --- | --- |
| Pt | 200 | 66 | 67 | 27 | 87 |
| Pd | >200 | 16 | >92 | 4.8 | >98 |
| Au | 0.6 | <0.5 | >17 | <0.5 | >17 |
| Ru | 3.6 | 2.1 | 42 | 1.8 | 50 |
| Ir | 3.8 | <2.5 | >34 | <2.5 | >34 |
| Rh | 28 | 12 | 57 | 9.7 | 65 |
| pH | <1 | <1 | — | <1 | — |

EXAMPLE 3

Commercial Ring - Dried Blood Meal (Wilson Foods Company), a mixture of coagulated, dried beef and hog bloods was tested for recovery of precious metals from a refinery process solution. In this test 20 grams of blood meal were added to a one liter sample of the refinery process solution and mixed with continuous moderate agitation for 7 hours at 20° C. The mixture was filtered through filter paper and the filtrate analyzed for precious metals contents. Results are shown in Table III.

TABLE III

| | Refinery Solution | Run 6 | Run 6 |
| --- | --- | --- | --- |
| Metal | mg/l | Filtrate mg/l | Recovery % |
| Pt | 11.9 | 1.4 | 88 |
| Pd | 0.7 | 0.07 | 90 |
| Rh | 5.8 | 0.80 | 87 |
| Au | 0.8 | 0.03 | 96 |
| Ir | 2.2 | <1.1 | >50 |
| Ru | 2.8 | <1.7 | >60 |
| pH | 2.4 | 2.4 | — |

It is evident from the foregoing examples that blood meal is effective for the removal of precious metals from dilute solutions:

I claim:

1. A process for recovering metal from an aqueous medium containing the metal in solution, which comprises contacting the aqueous medium with blood meal for a period of time sufficient to convert dissolved metal to a water-insoluble form, and separating the resulting loaded blood meal containing removed metal from the resulting treated aqueous medium.

2. The process of claim 1 further including the step of recovering the removed metal from the blood meal.

3. The process of claim 1 or claim 2 wherein the aqueous medium contains at least one of the metals platinum, palladium, rhodium, ruthenium, iridium or gold in solution.

4. A process according to claim 1 or claim 2 wherein the blood meal is maintained in contact with said aqueous medium for a period of at least one hour.

5. A process according to claim 3 wherein said contacting step is carried out at a temperature in the range of 5° to 90° C.

6. A process according to claim 1 or claim 2 wherein the blood meal is contacted with successive amounts of fresh aqueous medium.

7. A process according to claim 6 wherein successive amounts of fresh blood meal are contacted with previously contacted aqueous medium.

8. A process according to claim 7 wherein blood meal which has been subjected to contact with successive amounts of fresh aqueous medium is withdrawn from the process.

9. A process according to claim 8 wherein said blood meal is contacted with said aqueous medium in countercurrent contact, the solution first contacting blood meal which has previously been contacted with a relatively greater volume of aqueous medium and finally contacting blood meal which has previously been contacted with a relatively lesser volume of aqueous medium.

10. A process according to claim 1 wherein said aqueous medium is introduced into a contacting zone at a point adjacent one end thereof and said blood meal is introduced into said contacting zone at a point adjacent the other end thereof, and wherein said aqueous medium and said blood meal move through said contacting zone in opposite directions and in intimate countercurrent contact with one another, treated aqueous medium is removed from said zone adjacent the point of introduction of said fresh blood meal, and loaded blood meal containing recovered metals is removed from said zone adjacent the point of introduction of said aqueous medium.

* * * * *